United States Patent
Gordon

[11] 3,707,987
[45] Jan. 2, 1973

[54] ADJUSTABLE VALVE ASSEMBLY

[75] Inventor: Robert E. Gordon, Brooklyn, N.Y.

[73] Assignee: Mueller Steam Specialty Division SOS Consolidated, Brooklyn, N.Y.

[22] Filed: Aug. 3, 1970

[21] Appl. No.: 60,679

[52] U.S. Cl. .............. 137/543, 137/543.23, 251/83
[51] Int. Cl. ............................................. F16k 15/18
[58] Field of Search......... 137/522, 542, 543, 543.23, 137/DIG. 2; 251/83

[56] References Cited

UNITED STATES PATENTS

| 1,641,892 | 9/1927 | Lane | 251/83 |
| 3,486,527 | 12/1963 | Knight | 251/83 X |
| 3,540,471 | 11/1970 | Churchill | 251/83 X |
| 2,619,115 | 11/1952 | Dondero et al. | 137/543 X |
| 695,378 | 3/1902 | Cowles | 137/543.23 |
| 1,908,440 | 5/1933 | Milton | 137/DIG. 2 |
| 1,989,870 | 2/1935 | Lafferty | 137/DIG. 2 |
| 3,441,249 | 4/1969 | Aslan | 137/556 X |
| 371,075 | 10/1887 | Klein | 137/495 X |
| 2,777,465 | 1/1957 | Adams | 137/543.23 |
| 3,114,391 | 12/1963 | Kurtz | 137/522 X |

FOREIGN PATENTS OR APPLICATIONS 576,771   5/1933   Germany...................137/540

Primary Examiner—Martin P. Schwadron
Assistant Examiner—David J. Zobkiw
Attorney—Blum, Moscovitz, Friedman & Kaplan

[57] ABSTRACT

A valve capable of being adjusted so that it can function as a check valve, a throttle valve, or a shut-off valve. A valve housing has an upstream tubular inlet and a downstream tubular outlet coaxial with the inlet to provide a straight-line flow for fluid. Between the inlet and outlet the housing carries a valve seat having an annular seating surface, and a valve member extends across the valve seat and has a closure surface which engages the seating surface when the valve member is in a closed position. A spring continuously urges the valve member toward its closed position so that the function of a check valve is achieved. A shut-off member can be placed in a position maintaining the valve in its closed position, to achieve the effect of a shut-off valve, while an adjusting structure coacts with the shut-off member to adjust the extent to which the valve member can move before engaging the shut-off member so as to achieve in this way the operation of a throttle valve.

3 Claims, 4 Drawing Figures

PATENTED JAN 2 1973 3,707,987

INVENTOR
ROBERT E. GORDON
BY
Blum, Moscovitz, Friedman & Kaplan
ATTORNEYS

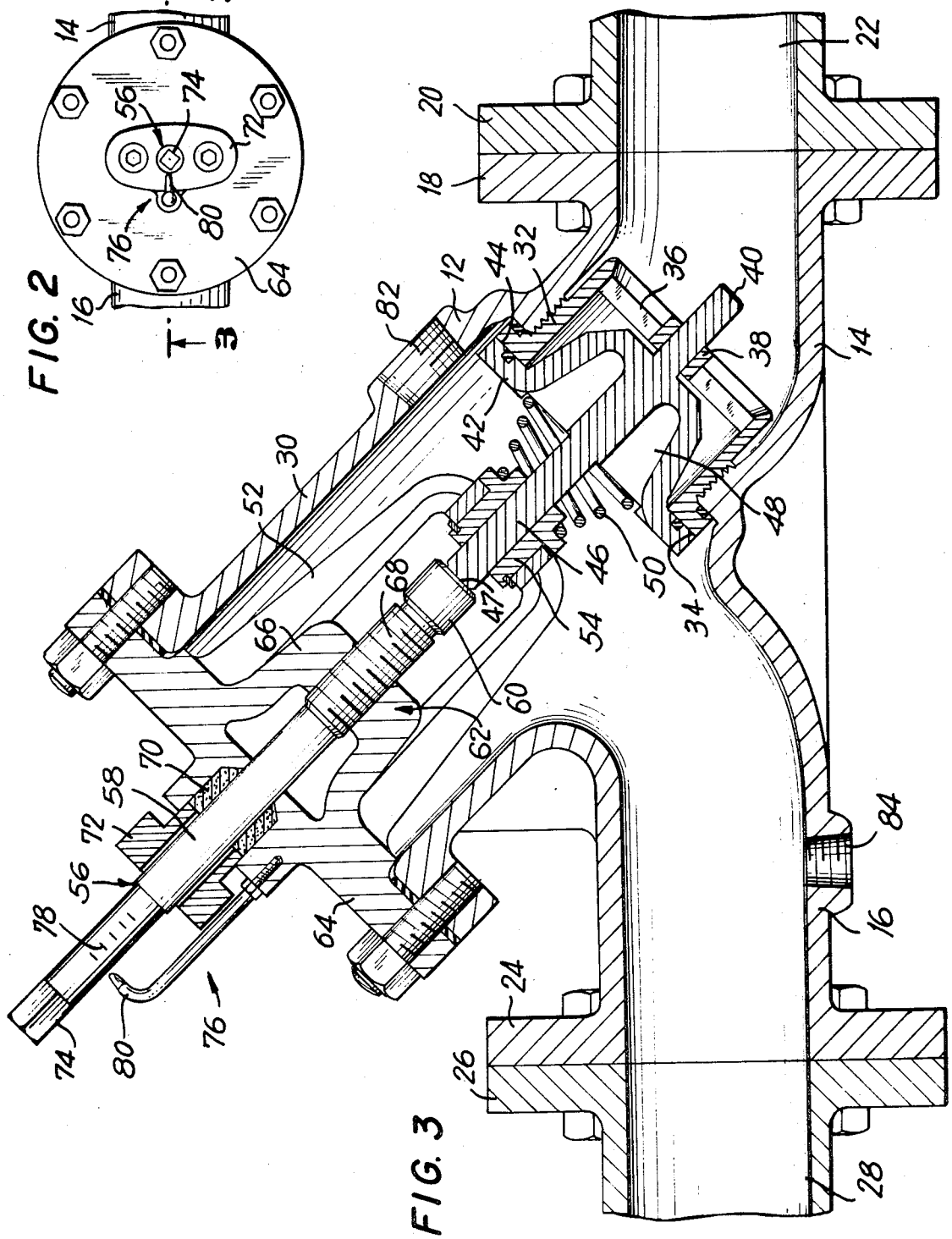

ADJUSTABLE VALVE ASSEMBLY

BACKGROUND OF THE INVENTION

The present invention relates to valves.

In particular, the present invention relates to a single valve structure which can be adjusted so as to achieve different types of valve operation.

At the present time it is required to provide valve structures of different types in order to achieve different types of operation. For example, when the operation of a check valve is required, then a spring-pressed valve member will generally be urged always towards its closed position to limit the flow of fluid to only one direction. On the other hand, if a shut-off valve is required, then a completely different type of valve such as a ball valve or a gate valve is used.

If a throttle valve is desired, then it is customary to situate in the pipe through which the fluid flows a throttle member in the form of a plate having a throttle aperture of a given size, for example. Thus, depending upon the type of operation that is required, distinctly different types of structures are required.

Moreover, even when using such structures certain drawbacks are encountered. For example when the flow of fluid is reversed, part of the fluid will flow in a reverse direction before a conventional check valve can close, giving rise to undesirable noise in the operation. Also, when a throttle valve is used, the extent of throttling can be achieved only with complex structures.

Also, it is highly desirable for many purposes to maintain for the fluid a straight-line flow. With conventional valves, however, particularly check valves, it is not always possible to achieve this type of flow, so that the direction of fluid flow is undesirably changed with conventional valves of certain types.

SUMMARY OF THE INVENTION

It is accordingly a primary object of the present invention to provide a valve structure which will avoid the above drawbacks.

Thus, it is an object of the invention to provide a valve structure which with one unitary valve assembly is capable of achieving not only check valve operations but also operations of a throttle valve and a shut-off valve.

Furthermore, it is an object of the invention to provide a construction of this type which will maintain a straight-line flow for the fluid.

In addition it is an object of the invention to achieve for the check valve operations a silent operation.

Furthermore, it is an object of the present invention to provide a construction which can easily be manipulated to achieve a selected degree of throttling.

Also it is an object of the invention to provide a construction of this type which is exceedingly simple and rugged and which at the same time can be easily operated to achieve a selected type of operation.

The valve of the invention includes a valve housing having an upstream tubular inlet and a downstream tubular outlet which is coaxial with the inlet to achieve the straight-line flow for the fluid. Between the inlet and outlet the valve housing carries a valve seat which has an annular seating surface directed away from the inlet. A valve member extends across the valve seat and has a closure surface for engaging the seating surface when the valve member is in a closed position. A spring means coacts with the valve member for continuously urging the latter to its closed position so as to achieve the action of a check valve. The valve member and valve seat have a common axis which is inclined at an acute angle, on the order of 45°, to that part of the common axis of the inlet and outlet which is downstream of the valve seat. A shut-off means coacts with the valve member for maintaining the latter on the valve seat, so as to achieve the operation of a shut-off valve. An adjusting means coacts with the shut-off means to adjust the distance between the latter and the valve member so as to adjust the extent to which the valve member can be displaced away from the valve seat, so as to achieve the operation of a throttle valve with a selected degree of throttling.

BRIEF DESCRIPTION OF DRAWINGS

The invention is illustrated by way of example in the accompanying drawings which form part of this application and in which:

FIG. 2 is a plan view of the valve of FIG. 1 taken along line 2—2 of FIG. 1 in the direction of the arrow;

FIG. 3 is a sectional elevation of the valve of FIG. 1 taken along line 3—3 of FIG. 2 in the direction of the arrow and showing the structure at a scale which is considerably larger than that of FIG. 2;

DESCRIPTION OF A PREFERRED EMBODIMENT

Figure 1:
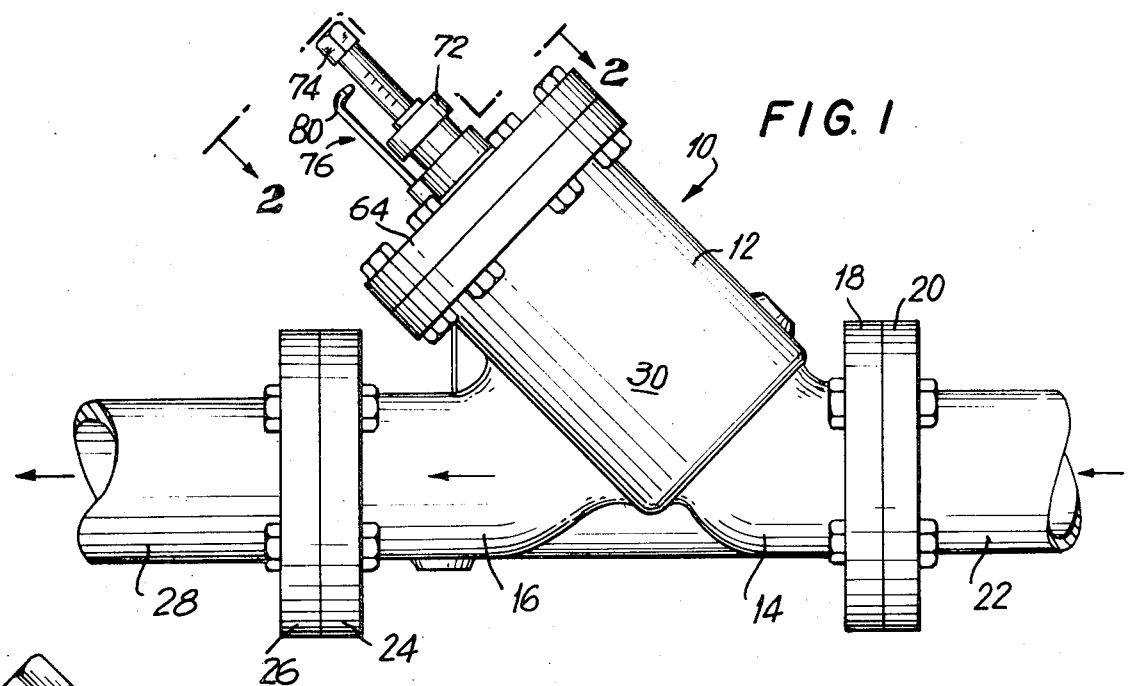
FIG. 1 is a side elevation of a valve of the invention.

Referring now to the drawings, FIG. 1 illustrates a valve 10 according to the invention. This valve has a housing 12. The housing 12 has an upstream tubular inlet 14 and a downstream tubular outlet 16. The inlet 14 is provided with a connecting flange 18 which may be connected to a flange 20 of a pipe 22 from which the fluid flows toward the valve 10. The outlet 16 terminates in a flange 24 which may be connected with a flange 26 of a discharge pipe 28 which receives fluid from the valve.

As is apparent particularly from FIG. 3, the upstream tubular inlet 14 and the downstream tubular outlet 16 have a common axis so as to achieve in this way a straight-line flow for the fluid, as is indicated by the arrows in FIG. 1.

Figure 4:
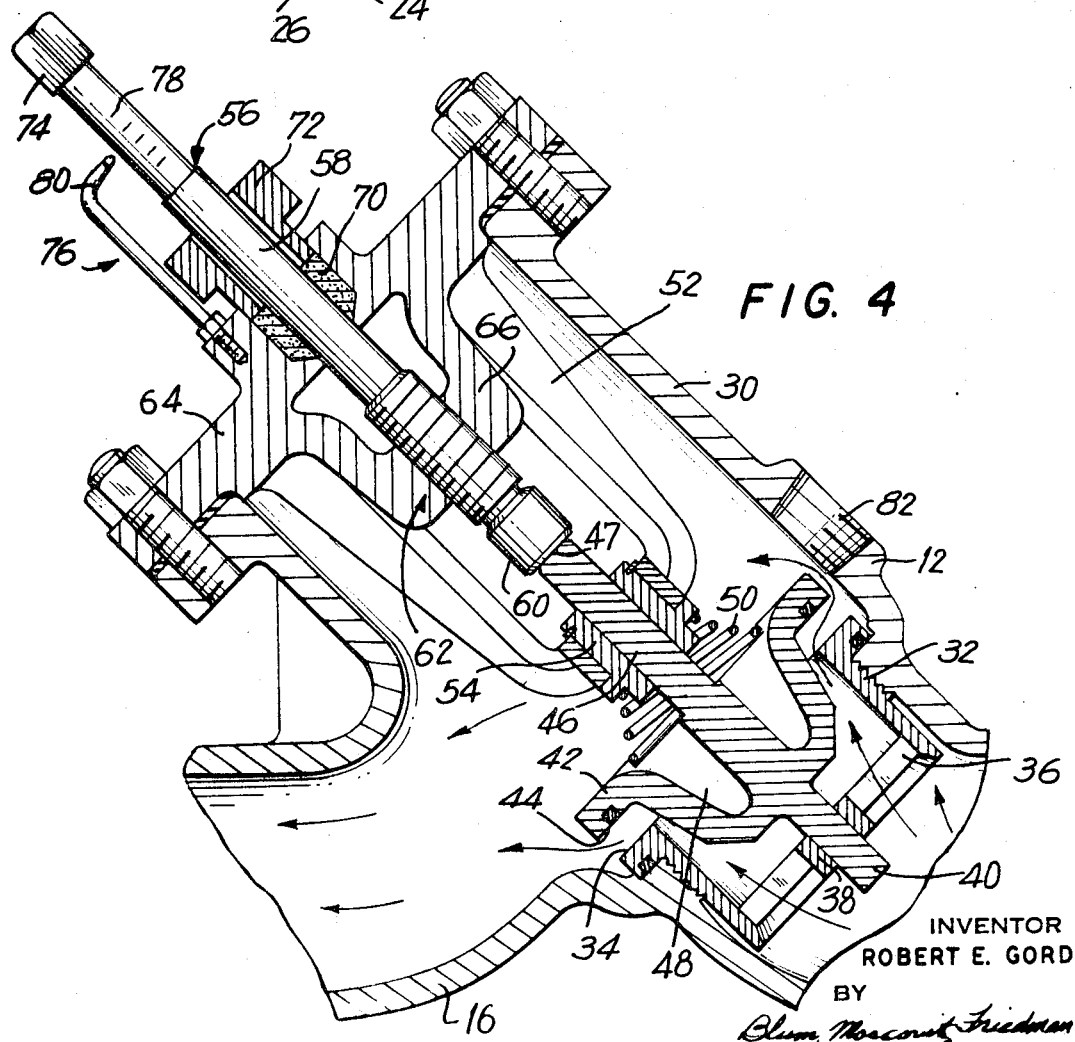
FIG. 4 is a fragmentary illustration of part of the structure of FIG. 3 in a different operating position.

Between the inlet 14 and outlet 16 the housing 12 has an inclined tubular portion 30 the interior of which is illustrated in FIGS. 3 and 4. At the region of the inlet 14 this extension 30 has a shoulder and is formed with an internal thread for receiving a tubular valve seat 32. This tubular valve seat 32 has an annular seating surface 34 (FIG. 4) which is directed away from the inlet 14. At its end which is directed toward the inlet 14 the tubular valve seat 32 carries a spider 36 which supports a central tube 38 for guiding a stem portion 40 of a valve member 42. This valve member 42 has a flat closure surface 44 of substantial area which engages the flat seating surface 34 over the entire area thereof when the valve member 42 is in the closed position shown in FIG. 3. The surface 44 is clearly visible in FIG. 4 which shows this surface spaced from the seating surface 34.

The valve member 42 also has an elongated stem portion 46 which extends away from the inlet 14 and terminates in an end surface 47. The substantially cup-shaped valve member 42 is provided with an interior web structure 48 having an end surface directed away from the inlet 14 and engaging one end of a coil spring 50 which is coiled about the stem portion 46. The housing 12 has integrally formed with the extension 30 fingers 52 which form a spider and fixedly carry a tubular guide 54 through which the stem 46 is slidable so as to achieve a guiding action for the valve member 42 in this way. The spring 50 presses at one end against the guide 54 and at its opposite end against the web structure 48 for continuously urging the valve member 42 toward the closed position thereof illustrated in FIG. 3, so that in this way the function of a check valve is achieved.

It will be noted that the valve seat 32 and valve member 42 have a common axis which is inclined to the common axis of the inlet 14 and outlet 16. This common axis of the valve seat 32 and valve member 42 preferably forms an acute angle on the order of 45° with the part of the common axis of the inlet 14 and outlet 16 which is situated downstream of the valve seat 32.

A shut-off means 56 is provided for maintaining the valve member 42 in the closed position shown in FIG. 3, so that in this way the action of a shut-off valve can be achieved. This shut-off means 56 is in the form of an elongated shut-off member 58 which can be displaced to the position shown in FIG. 3 where the end 60 of the shut-off member permanently presses against the surface 47 for maintaining the valve member 42 in its closed position.

An adjusting means 62 coacts with the shut-off means 56 for adjusting the distance between the latter and the valve member 42. Thus, it will be seen that the housing 30 is fluid-tightly closed by a closure member 64 which has an inner portion 66 surrounding the shank of the shut-off member 58. This inner portion 66 is formed with an inner thread which coacts with a threaded shank portion 68 of the shut-off member 58 to provide the adjusting means. The housing closure 64 has a fluid-tight guide 70 for the shut-off member 58 which extends through this guide, and an adjustable fitting 72 therefor, to the exterior where the shut-off member 58 has a non-circular end portion 74 capable of having a wrench applied thereto for turning the shut-off member 58. In this way the axial position of the shut-off member 58. In this way the axial position of the shut-off member can be adjusted to achieve either the shut-off action shown in FIG. 3 or the throttling action shown in FIG. 4.

In order to indicate to the operator the extent of throttling an indicating means 76 is provided. This indicating means 76 takes the form of graduations 78 on the exterior shank portion of the shut-off member 58 and an index 80 coacting with the graduation 78. This index is in the form of a single pointer fixedly carried by the closure 64 and coacting with the graduation 78 to indicate the axial position of the shut-off member 58.

It is to be particularly noted that with the illustrated structure when there is reversal in the fluid-flow, so that the fluid will tend to flow toward the right as viewed in FIG. 3, before any actual reverse flow of fluid can take place the valve member 42 will already have reached the closed position thereof shown in FIG. 3. Therefore, this construction acts to achieve a full closure before any actual reverse flow can take place, and thus a silent valve action is assured.

In order to achieve the action of a check valve it is only necessary to turn the shut-off member 58 out of the housing to an extent where the end 60 of member 58 is situated in the region of the part 66 of the housing, and now a check valve action will be achieved since the valve member 42 at this time is only under the influence of the spring 50 which forms a spring means continuously urging the valve member 42 to its closed position.

However, it is also possible to adjust the valve 10 by situating the shut-off member 58 at a selected distance from the valve member 42. Thus, with an arrangement as shown, for example, in FIG. 4, the extent to which the valve member 42 can be displaced away from the valve seat is limited with the adjusting means of the invention to achieve a limited extent of opening movement and thus achieving the action of a throttle valve where the extent of throttling can be selected. This is the position of the components illustrated in FIG. 4.

On the other hand, if it is desired simply to shut-off the flow of fluid so that the function of a shut-off valve is achieved, it is only necessary to turn the shut-off member 58 to the position shown in FIG. 3 where it permanently maintains the valve member 42 in its closed position.

Thus, with the above simple and rugged structure of the invention it is possible to achieve in a highly reliable manner the above different types of operation. The housing 12 has threaded bores 82 and 84 which may be closed by suitable plugs. The above-described structure of the invention is particularly suitable for use in pipelines, and in particular pipelines of heating and air-conditioning plants.

What is claimed is:

1. A valve comprising a housing having at an upstream end a tubular inlet and at a downstream end a tubular outlet coaxial with said inlet, to provide a straight-line throughflow for fluid, a valve seat carried by said housing between said inlet and outlet thereof and having an annular flat seating surface of substantial area directed away from said tubular inlet of said housing, a valve member extending across said valve seat in the path of fluid flow from said inlet to said outlet and having a flat closure surface engaging said seating surface over said substantial area thereof when said valve member is in a closed position preventing flow of fluid from said inlet to said outlet, and spring means coacting with said valve member for continuously urging the latter into engagement with said seat so that a check valve operation limiting the flow only from said inlet to said outlet is achieved, said valve seat and valve member having said flat surfaces thereof respectively located in parallel planes normal to a common axis inclined to the common axis of said inlet and outlet and forming an acute angle with the latter common axis, a shut-off means coacting with said valve member for maintaining the latter in engagement with said seat so that the function of a shut-off valve is also achieved, adjusting means coacting with said shut-off means for adjusting the distance between the latter and said valve member to provide for said valve member an adjusted degree of opening movement away from said valve seat, to achieve also the operation of a throttle valve, said valve member having a first elongated stem extending along the common axis of said valve member and valve seat and terminating in an end surface directed away from said inlet and a second elongated stem coaxial with said first stem and extending toward said inlet, said shut-off means including an elongated shut-off member engaging said end surface of said first valve stem to maintain said valve member in its closed position, and said adjusting means including an elongated threaded shank portion of said shut-off member and a nut engaging said threaded shank portion, so that said shank portion can be turned to be situated at a selected distance from said end surface of said valve stem, said shut-off member having an exterior portion provided with graduations distributed axially along said latter exterior portion, and an index carried by said housing and coacting with said graduations for indicating the position of said shut-off member along the common axis of said valve member and valve seat to indicate either the shut-off position or the degree to which said valve member can be displaced away from said valve seat to achieve the action of a throttle valve, first and second spiders respectively carried by said housing and said valve seat, and first and second tubular guides respectively carried by said spiders and surrounding and engaging said first and second stems, respectively, for guiding said valve member for movement precisely along said common axis of said valve member and valve seat.

2. The combination of claim 1 and wherein said common axis of said valve seat and valve member from an acute angle on the order of 45° with that part of the common axis of said inlet and outlet which is downstream of said valve seat.

3. The combination of claim 2 and wherein said shut-off member terminates at the exterior of said housing in a non-circular end portion facilitating the turning of said shut-off member.

* * * * *